United States Patent Office 3,004,769
Patented Oct. 17, 1961

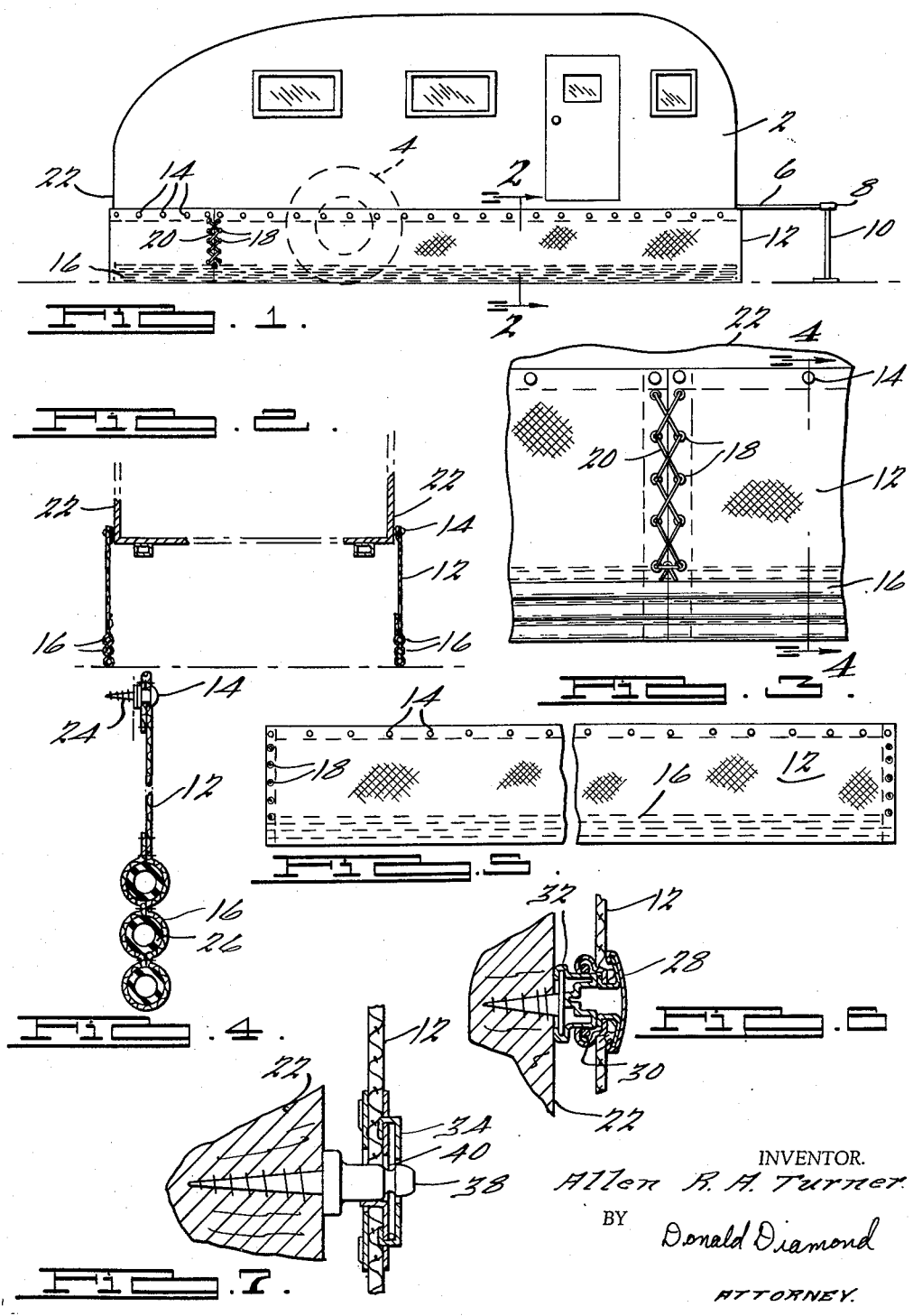

3,004,769
TRAILER SKIRT
Allen R. A. Turner, 509 E. McClellan, Flint 5, Mich.
Filed Sept. 9, 1958, Ser. No. 759,936
4 Claims. (Cl. 280—150)

This invention relates to portable house trailers and, more particularly, it pertains to a trailer skirt particularly adapted for enclosing the aperture between the bottom peripheral edge of a house trailer and the trailer supporting surface.

House trailers are compact housing units and, as currently designed and built, are suitable in most climates for all-year occupancy. The modern portable house trailer has plumbing, heating and electrical facilities as well as kitchen appliances and comfortable sleeping accommodations which can be converted into daytime living quarters and, in general, contains many of the conveniences which are found in permanent type housing. Although the portable house trailer is adapted to be easily and rapidly moved from one locale to another, the trend has been not merely to employ the house trailer as a temporary camping trailer but to use it as a permanent residence. Thus, trailer parks providing facilities for many portable house trailers are common.

Since the house trailer is a compact housing unit mounted upon a chassis which is, in turn, supported by suitable wheels, there is, therefore, a space between the bottom of the trailer and the trailer supporting surface which space permits wind, rain, snow and other elements to contact the underside of the trailer as well as the tires supporting the trailer. The exposure of the underside of the trailer to the elements of the weather is particularly undesirable because it causes drafts along the floor in the winter and dampness during the periods of heavy precipitation.

In addition, it would be desirable to convert the space between the bottom of the trailer and the trailer supporting surface to a storage area, since the house trailer, being a portable unit, has only a minimum amount of storage space within.

An object of this invention is, therefore, to provide a structure which is particularly adapted for enclosing the aperture between the bottom edge of a house trailer and the trailer supporting surface.

Another object of this invention is to provide a trailer skirt which will insulate the underside of the trailer as well as the tires supporting the trailer from the wind, rain, snow and other elements of the weather.

Another object of this invention is to provide a trailer skirt which will not only enhance the appearance of the trailer but will also increase the available storage area for the occupants of the trailer.

A further object of this invention is to provide a trailer skirt which is particularly adapted for enclosing the aperture between the bottom edge of a house trailer and the trailer supporting surface which is both easy and economical to manufacture.

A further object of this invention is to provide a trailer skirt which is flexible and, therefore, readily foldable into a compact unit for storage while the trailer is in transit.

A still further object of this invention is to provide an approximately rectangularly shaped flexible trailer skirt which contains fastening elements along one longitudinal edge for readily and easily detachably engaging the trailer skirt to the trailer body.

A still further object of this invention is to provide an approximately rectangularly shaped flexible trailer skirt which contains fastening elements along one longitudinal edge for detachably engaging the trailer skirt to the trailer body, a plurality of continuous loops near the opposite longitudinal edge for receiving and positioning at least one weighted flexible rod, the weight of said rod maintaining the trailer skirt in relatively fixed position with respect to the trailer supporting surface and means for maintaining the lateral edges of the skirt in proximate relationship with each other.

These and other objects are accomplished, in accordance with a preferred embodiment of the invention, by providing a trailer skirt particularly adapted for enclosing the aperture between the bottom edge of a house trailer and the trailer supporting surface, which comprises, in general, an approximately rectangularly shaped flexible member containing a plurality of snap fasteners along one longitudinal edge for detachably engaging the trailer skirt to the trailer body, a plurality of adjacently disposed continuous loops near the opposite longitudinal edge for receiving and positioning at least one flexible rod whereby said skirt is maintained in relatively fixed position with respect to the trailer supporting surface and a plurality of oppositely disposed eyelets along the lateral edges of the skirt for receiving a draw lace whereby the lateral edges are held in proximate relationship with each other.

The accompanying drawing illustrates a certain selected embodiment of the invention, and the views therein are as follows:

FIG. 1 is a side elevation of a portable house trailer showing the trailer skirt of the invention attached along the bottom peripheral edge of the trailer body and extending down to the trailer supporting surface.

FIG. 2 is a transverse section along the line 2—2 in FIG. 1.

FIG. 3 is a detail exploded view of the lateral edges of the trailer skirt being held in proximate relationship with each other by a draw lace.

FIG. 4 is a detail transverse sectional view along the line 4—4 of FIG. 3.

FIG. 5 is a diagrammatic illustration of the trailer skirt of the invention.

FIG. 6 is a transverse sectional view of one type of snap fastener which can be employed to detachably engage the trailer skirt to the trailer body.

FIG. 7 is a transverse sectional view of a different type of snap fastening element which can be employed to detachably engage the trailer skirt to the trailer body.

Referring to the drawing in more detail and to FIG. 1 specifically and wherein like reference characters refer to like parts throughout the several figures, a portable house trailer of conventional construction 2 is mounted upon a chassis which is, in turn, supported by a pair of wheels 4. The trailer is provided with a conventional tongue 6 and swivel coupling member 8 for attaching the same to a corresponding part on an automobile, truck or other transporting vehicle. When the trailer is being used as a stationary residence, a support member 10 can be employed to maintain the floor of the trailer in parallel relationship with the trailer supporting surface. A trailer skirt containing the novel features of this invention and generally designated 12 is detachably engaged to the trailer body 11 and extends down to the trailer supporting surface.

The trailer skirt 12 is a flexible member which can be fabricated from canvas, cloth or Fiberglas. Metals are also suitable as materials of construction for the trailer skirt as long as the metals or alloys employed yield flexible members. In a preferred embodiment, canvas is employed as the material of construction because of its high strength and good resistance to the weather. However, any material of construction can be employed as long as it is light in weight, flexible and offers resistance to the weather.

The trailer skirt 12 is removably secured to the bottom peripheral edge of the trailer body 22 by a plurality of snap fastening elements 14 in approximate uniform distribution along one longitudinal edge of the trailer skirt. Although a wide variety of snap fasteners can be employed, two different forms are illustrated. In FIG. 6, for example, a snap fastener body 32 is threadedly connected to the trailer body 22 and the portion extending beyond the trailer is enclosed by the snap fastener head 28 disposed within the trailer skirt 12. A flexible, resilient locking member or spring clip 30 locks the two parts together but also permits easy separation by pulling the trailer skirt away from the trailer body. In FIG. 7, on the other hand, the snap fastener body 38 which is threadedly engaged to the trailer body 22 protrudes through the snap fastener head assembly 34 disposed within the trailer skirt 12. A resilient member permits the head of the snap fastener body to pass through the snap fastener head receptacle and engages groove 40 in the snap fastener body and thereby detachably locks the two parts together. Other fastening elements can also be employed for this purpose such as hook and eyelet or turn button and eyelet. Snap fasteners are, in general, preferred because they provide a more secure fit and, thus, provide better insulation against the weather.

The trailer skirt comprises a one-piece flexible member which extends completely around the periphery of the trailer and is illustrated in FIG. 5. Although a multi-sectional trailer skirt is within the scope of the invention, a one-piece skirt is preferred because of simplicity of handling in attaching it to and removing it from the trailer body. In addition, a one-piece unit is more easily stored within the trailer when the trailer is in transit. The lateral edges of the trailer skirt contain a plurality of oppositely disposed eyelets 18 for receiving a draw lace 20. When the trailer skirt is fastened to the trailer, the draw lace holds the lateral edges of the trailer skirt in weather-insulating relationship with each other. The use of a draw lace for this purpose is illustrated in FIG. 3. Other suitable fastening means such as snap fasteners or turn button and eyelet can also be used to hold the lateral edges of the trailer skirt in side-by-side relationship.

To prevent transverse or lateral movement with respect to the trailer body or trailer supporting surface, a plurality of adjacently disposed continuous loops 16 are provided near the bottom edge of the trailer skirt for receiving and positioning at least one weighted flexible rod 26. The continuous loops extend the length of the trailer skirt and a plurality of loops are provided for so as to accommodate trailers which may be at various heights from the supporting surface. A continuous loop can be prepared by sewing a piece of fabric to the canvas skirt so as to provide a hollow cylindrical body extending the length of the trailer skirt. Any type of rod is suitable as long as it is flexible and has a weight of about one-half pound per running foot. The rods can be fabricated from rubber, high molecular weight plastic type materials, aluminum or other similar materials of construction. The length of the flexible rod corresponds to the length of the trailer skirt and is easily placed in position by sliding it through the continuous loop. A transverse sectional view of a continuous loop revealing a flexible rod disposed therein is illustrated in FIG. 4.

Thus, the objects of this invention have been accomplished, namely, a trailer skirt has been provided which insulates the trailer from the weather, provides additional storage space, enhances the appearance of the trailer and is both simple and economical to manufacture and which comprises an approximately rectangularly shaped flexible member containing a plurality of fastening elements along one longitudinal edge for detachably engaging the skirt to the trailer body, a plurality of continuous loops near the opposite longitudinal edge for receiving and positioning at least one weighted flexible member and a plurality of oppositely disposed eyelets along the lateral edges of the skirt for receiving a draw lace whereby the lateral edges are held in proximate relationship with each other.

I claim:

1. In combination with a house trailer having a plurality of attachment means disposed along the bottom peripheral edge of said trailer, a trailer skirt, said skirt extending around the bottom peripheral edge of said trailer and downwardly to the trailer supporting surface and comprising a flexible member having means along the upper longitudinal edge thereof in detachable engagement with the attachment means disposed along the bottom peripheral edge of said trailer, a plurality of adjacently disposed continuous loops near the lower longitudinal edge thereof, at least one weighted, flexible rod being disposed within one of said loops whereby said skirt is maintained in relatively fixed position with respect to the trailer supporting surface, and means for maintaining the lateral edges of said trailer skirt in proximate relationship with each other.

2. In combination with a trailer skirt having a plurality of attachment means disposed along the bottom peripheral edge of said trailer, a trailer skirt, said skirt extending around the bottom peripheral edge of said trailer and downwardly to the trailer supporting surface and comprising a flexible member having means along the upper longitudinal edge thereof in detachable engagement with the attachment means disposed along the bottom peripheral edge of said trailer, a plurality of adjacently disposed continuous loops near the lower longitudinal edge thereof, at least one weighted, flexible rod being disposed within one of said loops whereby said skirt is maintained in relatively fixed position with respect to the trailer supporting surface, a plurality of oppositely disposed eyelets along the lateral edges of said skirt and a draw lace extending through said eyelets for holding said lateral edges in proximate relationship with each other.

3. In combination with a house trailer having a plurality of snap fastener bodies mounted along the bottom peripheral edge of said trailer, a trailer skirt, said skirt extending around the bottom peripheral edge of said trailer and downwardly to the trailer supporting surface and comprising a flexible member having a plurality of snap fastener heads mounted along the upper longitudinal edge thereof in detachable engagement with the plurality of snap fastener bodies mounted along the bottom peripheral edge of said trailer, a plurality of adjacently disposed continuous loops near the lower longitudinal edge thereof, at least one weighted, flexible rod being disposed within one of said loops whereby said skirt is maintained in relatively fixed position with respect to the trailer supporting surface, and means for maintaining the lateral edges of said trailer skirt in proximate relationship with each other.

4. In combination with a house trailer having a plurality of snap fastener bodies mounted along the bottom peripheral edge of said trailer, a trailer skirt, said skirt extending around the bottom peripheral edge of said trailer and downwardly to the trailer supporting surface and comprising a flexible member having a plurality of snap fastener heads mounted along the upper longitudinal edge thereof in detachable engagement with the plurality of snap fastener bodies mounted along the bottom peripheral edge of said trailer, a plurality of adjacently disposed continuous loops near the lower longitudinal edge thereof, at least one weighted, flexible rod being disposed within one of said loops whereby said skirt is maintained in relatively fixed position with respect to the trailer supporting surface, a plurality of oppositely disposed eyelets along the lateral edges of said skirt and a draw lace extending through said eyelets for maintaining said lateral edges in proximate relationship with each other.

(References on following page)

References Cited in the file of this patent

UNITED STATES PATENTS

| | | |
|---|---|---|
| 467,423 | Merritt | Jan. 19, 1892 |
| 1,351,085 | Witt | Aug. 31, 1920 |
| 1,545,093 | Gallob | July 7, 1925 |
| 1,801,645 | Sherman | Apr. 21, 1931 |
| 2,059,869 | Holecek | Nov. 3, 1936 |
| 2,272,656 | Byron | Feb. 10, 1942 |
| 2,604,671 | Sherman et al. | July 29, 1952 |
| 2,618,493 | Fransen et al. | Nov. 18, 1952 |
| 2,771,945 | Wittrup | Nov. 27, 1956 |